H. G. VOIGHT.

DOOR OPERATING AND LOCKING DEVICE.

APPLICATION FILED AUG. 3, 1916.

Reissued Nov. 28, 1916.

14,222.

2 SHEETS—SHEET 1.

Inventor
Henry G. Voight
By his Attorneys
Mitchell & Allyn.

THE NORRIS PETERS CO., PHOTO-LITHO., WASHINGTON, D. C.

H. G. VOIGHT.

DOOR OPERATING AND LOCKING DEVICE.

APPLICATION FILED AUG. 3, 1916.

Reissued Nov. 28, 1916.

14,222.

2 SHEETS—SHEET 2.

Inventor
Henry G. Voight
By his Attorneys
Mulchee & Calleyn

THE NORRIS PETERS CO., PHOTO LITHO., WASHINGTON, D. C.

UNITED STATES PATENT OFFICE.

HENRY G. VOIGHT, OF NEW BRITAIN, CONNECTICUT.

DOOR OPERATING AND LOCKING DEVICE.

14,222. Specification of Reissued Letters Patent. Reissued Nov. 28, 1916.

Original No. 1,112,342, dated September 29, 1914, Serial No. 828,615, filed March 31, 1914. Application for reissue filed August 3, 1916. Serial No. 113,024.

*To all whom it may concern:*

Be it known that I, HENRY G. VOIGHT, of New Britain, in the county of Hartford and State of Connecticut, have invented certain new and useful Improvements in Door Operating and Locking Devices; and I do hereby declare the following to be a full, clear, and exact description of the invention, such as will enable others skilled in the art to which it appertains to make and use the same.

My invention relates to door operating and locking device and adapted particularly for the doors of elevator wells, the object being to provide a construction wherein the actuating lever for opening the door may be within easy reach of the operator standing at the elevator controlling mechanism, and be so connected with the door controlling levers as to apply the power to the latter at such point, that, the door may be readily opened by the expenditure of less power, and consequently in a shorter time, than is possible with the constructions now in use.

A further object is to so construct and arrange the door actuating levers that when the door is open, less power will be required to close it than is now necessary with the devices in use.

With these objects in view my invention consists in the parts and combination of parts as will be more fully explained and pointed out in the claims.

Figure 1:
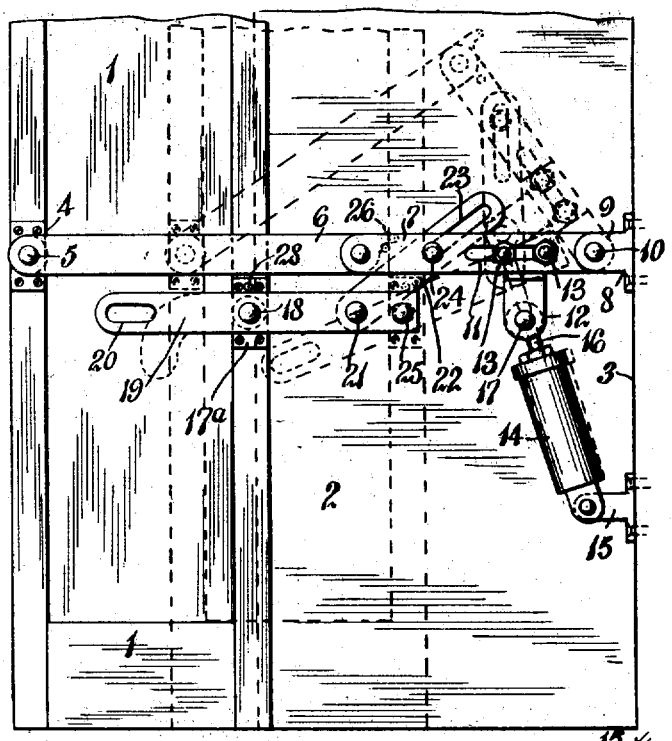
Figure 2:
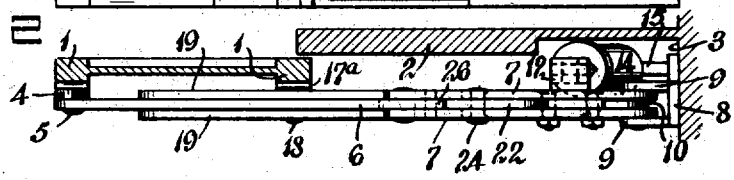
Figure 4:
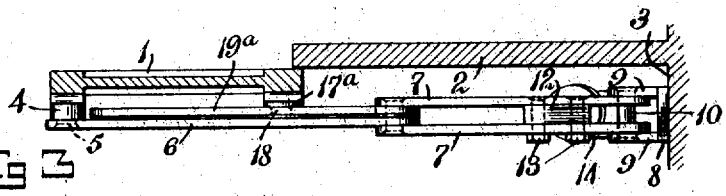
Figure 3:
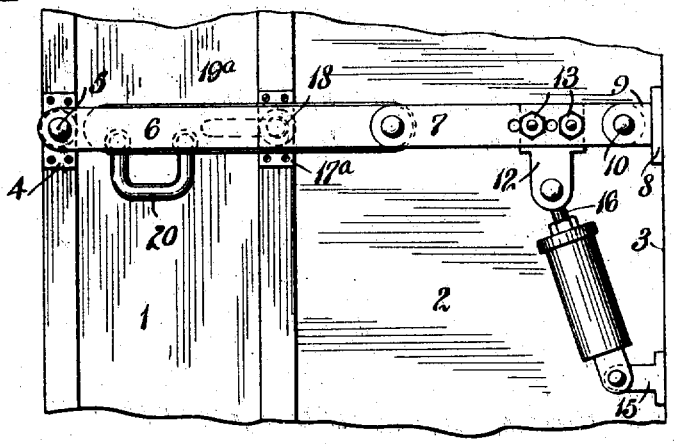
Figure 5:
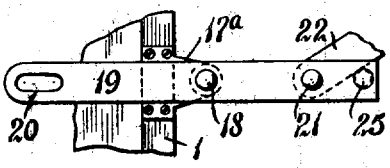
Figure 6:
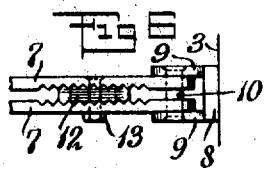

In the accompanying drawings: Figure 1 is a view in elevation of the inner side of an elevator well door as viewed from the elevator car, the position of the parts, in door open position, being indicated in dotted lines. Fig. 2 is a view in plan of the lever mechanism. Fig. 3 is a view in elevation of a modified form. Fig. 4 is a view in plan of the construction shown in Fig. 3, and Figs. 5 and 6 are views of modifications.

1 represents a sliding door of any construction, 2 the panel or casing at the rear of which the door slides in opening, and 3 represents the wall of the well. Attached to the outer or lock stile of the door, is a plate 4, having a stud 5 on which the free end of lever 6 is journaled, the said lever extending transversely across the door, and pivotally connected at its rear end to and between the front ends of the twin levers 7, the latter being journaled at their rear ends to the bracket 8 attached to the wall 3 of the elevator well. This bracket is provided in the present instance, with two ears 9, carrying a pin 10 on which the levers 7 are mounted, and the latter are provided with means, preferably elongated slots 11, for the adjustable attachment of the depending arm 12, which is pivotally attached at its lower end to the door closer. This arm 12, is entered between the twin levers 7 and forms a spacing block for the latter, and is secured to said levers by the bolts 13 passing through the arm 12, and through the elongated slots 11 in said levers. The object in using elongated slots, is to so locate the arm 12 with relation to the door closer and the toggle levers 6 and 7, that, when the door is open, the spring in the door closer will be under maximum compression. After the arm has been properly located, it is locked by the bolts 13. It is clearly evident that instead of using elongated slots as shown, I may use a plurality of holes as shown in Fig. 3, or I may corrugate the contacting faces of the arm 12 and lever 7 and lock the arm by a single bolt as shown in Fig. 6. The two levers 6 and 7, form toggle levers of unequal length, the levers which are connected to the closing and checking mechanism being shorter than the lever connected with the door, so that less power will be required to close the door than would be the case with levers of equal length, or where the lever attached to the door is of less length than the lever connected with the door closer.

The door closer may be substantially as shown in Patent No. 1,085,070 granted to me January 20th, 1914, and consists of a cylinder 14, pivoted at its lower end to bracket 15 secured to the end wall 3 of the elevator well, and carrying a valve piston to which the rod 16 is connected, the said rod passing through a stuffing box in the upper end of cylinder 14 and connected at its upper end to the arm 12 by pin 17. The cylinder contains a liquid, which, when the door is closed, rests above the piston, and a spring within the cylinder above the piston, normally tends to depress the piston, so that as the door 1 is opened the piston will be elevated thus compressing the spring and causing the liquid to pass through the valved opening in the piston to a position below the latter, and thus act to cushion the closing action, due to the pressure or expansion of the spring during the closing movement of the door.

Secured to the inner stile of the door 1, is the plate 17[a] having a lug 18 on which the actuating lever 19 is mounted. The front or handle end 20 of this lever is supposed to be within easy reach of the operator standing in position adjacent the car control, and if necessary its front end may be turned down so as to bring it closer to the wall 3 as shown in dotted lines in Fig. 1, or the plate 17 may have a rearwardly extending bracket carrying the lug 18, so as to carry the axis of the lever to the rear as shown in Fig. 5.

Pivotally secured by pin 21 to lever 19, in rear of the pivotal point or axis of the latter, is the upwardly inclined link 22, provided at its upper end with an elongated slot 23 through which the pin 24 carried by the twin levers 7 passes. This link passes up between said levers 7 and engages the pin 24, and also rests against the top side of shoulder 25 at the rear end of lever 19. Lever 6 terminates at its rear end in a finger 26, shown in dotted lines in Fig. 1, which, when the door is closed supports the toggle levers on a dead center or in their door locking position.

To open the door, the operator grasps the handle 20 of lever 19, and pulls or pushes downwardly thereon. This elevates link 22, and the latter bearing against pin 24 carried by the shorter lever 7, and located adjacent the hinge joint connecting said toggle levers, applies the opening power against said levers at a point where the greatest possible leverage is obtainable, and thus readily breaks the joint in the toggle and starts the opening movement of the door. As the lever 19 is carried by the door, it will be seen that a pull on lever 19 first breaks the toggle joint and then opens the door. As the door moves to open position, the longer lever 6 elevates the front end of twin levers 7 which pull upwardly on the piston rod 16, and puts the spring in cylinder 14 under compression. As soon as handle 19 is released by the operator, the spring acting against the piston, forces the latter inwardly and pulling, through the rod 16 on the toggles, brings the latter down to horizontal or dead center position, and when in such latter position the toggles act as a lock for the door.

Link 22 normally rests on shoulder 25 carried by the rear end of lever 19, and the pin 24 in toggle lever 7, rests in the elongated slot in said link, hence after the initial movement of lever 19 to break the toggle joint, the said lever 19 comes in contact with stop 28 on plate 17[a], thus forming in effect a rigid handle by which the door is pulled to open position, the slot 23 in link 22 permitting the latter to freely swing with the opening movement of the links without interfering in the least with the latter.

In the construction shown in Figs. 3 and 4, I have dispensed with the link 22 and connected lever 19[a] directly at the joint of the toggle lever, and provided the lever 19[a] with an elongated slot through which the pivot pin on the inner stile of the door passes. In other respects it may be like the construction shown in Fig. 1.

Great difficulty has heretofore been experienced in the use of these devices on elevator doors due to the fact, that, as the width of the opening in the elevator well has increased, it has been necessary to proportionately lengthen the toggle arms, thus necessitating a proportionate increase in power necessary to break the joint which makes the work quite laborious.

In order to make the device most efficient for quick closing, it is necessary that the rear toggle lever be as short as possible, consequently the front lever must be proportionately lengthened, and as stated above, this lengthening of the front lever increases the power necessary to break the joint and start the opening movement.

With my improvement the leverage for breaking the toggle is in no wise affected by any increase in length of the front toggle arm consequently I get the greatest efficiency both in breaking the toggle and also in closing the door.

It will be noted that by reason of the arrangement of parts and the assemblage of the various elements, the levers are held against side-slap or lateral swaying movement which might, unless prevented, invite accidents and damage. While I have referred herein mainly to the use of my improved controller in connection with an elevator well door, obviously its use is not limited thereto. For example, this style of closer would have great utility applied to a freight car door, and in such a connection the closer mechanism 14 might or might not be used, as desired. Again, in such a use the arrangement of the operating device shown herein is such that the controller may be used to the greatest advantage for opening heavy doors, inasmuch as anyone desiring to open a freight car door could reach up to the horizontal handle 20 and then by pulling down movement, which is gradually transformed into a horizontal sliding movement, the freight car door would be unseated and slid open with the greatest ease. By causing one of the toggles to overlap the operating member, for example as shown in Figs. 3 and 4, one member protects and tends to steady the other.

I might enumerate many other advantages that could be attributed to the construction herein shown and described, but I have referred to enough of the same to make apparent the novelty and wide utility of the said apparatus.

It should be understood that I have shown my invention only in certain preferred forms, and as employed for example for doors for elevator wells, accordingly, it is apparent that various changes in the construction, application and use of the said invention may be resorted to without departure from the scope of my invention.

What I claim is:

1. Means for opening and closing a sliding door consisting of toggle levers connected at one end to the door and at the other end to a fixed support, an actuating lever mounted to turn on a support carried by the door, a link having pivotal connection with the actuating lever and loosely connected with the toggle lever adjacent the joint in the latter, and automatic means for moving the levers in a direction to close the door.

2. Means for opening and closing a sliding door consisting of toggle levers connected at one end to the door and at the other end to a fixed support, an actuating lever mounted to turn on a support carried by the door and connected with the toggle lever at the rear of the joint, and automatic means for moving the levers in a direction to close the door.

3. Means for opening and closing a sliding door consisting of two connected levers, one longer than the other, the longer lever being connected to the door and the shorter lever to a fixed support, an actuating lever carried by the door and connected with the shorter lever and automatic means for moving the levers in a direction to close the door.

4. Means for opening and closing a sliding door consisting of two connected levers one longer than the other, the longer lever being connected to the front stile of the door and the shorter lever to a fixed support, an actuating lever carried on a support secured to the rear stile of the door and connected with said shorter lever at the rear of the joint and means for moving said levers in a direction to close the door.

5. In a sliding door opening and closing mechanism, the combination of a lever pivoted to a fixed support, mechanism connected with said lever for automatically closing the door, an actuating lever fulcrumed intermediate its ends on a support carried by the door, a link pivoted to said actuating lever adjacent the rear end of the latter provided with an elongated slot and a pin carried by said first mentioned lever and passing through the slot in the link.

6. In sliding door opening and closing mechanism, the combination of toggle levers connected at one end to a door and at the other end to a fixed support, an actuating lever mounted to turn on a support carried by the door and connected with the toggle levers adjacent the joint in the latter and door closing mechanism adjustably connected with one of said levers.

7. In sliding door opening and closing mechanism, the combination of toggle levers connected at one end to the door and at the other end to a fixed support, a door closing mechanism connected with one of said levers, an actuating lever pivoted to a support on the door, a stop for limiting the turning movement of said actuating lever, a slotted link connected to the rear end of said actuating lever, a pin on one of the toggle levers passing through the slot in the link for operatively connecting the link to the levers, and a shoulder on the actuating lever against which the link normally rests.

8. In a sliding door controller, a pair of toggle links, one end of one of said links being arranged to be pivotally connected to a door and one end of the other link being arranged to be connected to a relatively stationary pivot, an operating member located underneath one of said links and pivotally mounted intermediate its length, one end of said member being operatively connected with said toggle to move the same, the other end being provided with an operating handle whereby a downward strain thereon will operate to buckle said toggles vertically.

9. In a sliding door controller, a pair of toggle links, one end of one of said links being arranged to be pivotally connected to a door and one end of the other link being arranged to be connected to a relatively stationary pivot, an operating device located underneath one of said links and pivotally mounted intermediate its length, one end of said device being operatively connected with said toggle to move the same, the other end being provided with an operating handle whereby a downward strain thereon will operate to buckle said toggles vertically, part of one toggle being arranged to overlap part of said device to hold said toggle against lateral buckling when the parts are in the door closed position.

10. In a sliding door controller, a pair of toggle links, one end of one of said links being arranged to be pivotally connected to a door and one end of the other link being arranged to be connected to a relatively stationary pivot, an operating bar located underneath one of said links and pivotally mounted intermediate its length, one end of said bar being operatively connected with said toggle to move the same, the other end being provided with an operating handle whereby a downward strain thereon will operate to buckle said toggles vertically, and whereby a reverse strain on said handle will cause said toggles to move into the door closed position.

11. In a sliding door controller, a pair of toggle links, one end of one of said links being arranged to be pivotally connected to a door and one end of the other link being arranged to be connected to a relatively stationary pivot, a manually operable toggle operating member located adjacent to one of said links and pivotally mounted to swing, part of said member coöperating with one of said toggles to move the same by the application of a downward strain on another part of said member.

12. In a sliding door controller, a pair of toggle links pivotally connected to each other, the free end of one of said links being arranged to be pivotally connected to a door, the free end of the other link being arranged to be pivotally connected to a relatively stationary abutment, an operating bar arranged to be pivoted intermediate its length to said door at a position intermediate the length of one of said toggle links, said last mentioned link and said operating bar being substantially parallel when the toggle links are in the door closed position.

13. In a railway car door operating apparatus, a pair of pivotally connected toggle links, means for pivotally connecting the free end of one link to the car door, and means for pivotally connecting the free end of the other link to a car body, and manually operable means for applying an upward strain to said links to buckle the same and open the door upon the application of a downward strain on one part of said means.

14. In a railway car door operating apparatus, a pair of pivotally connected toggle links, means for pivotally connecting the free end of one link to the car door, and means for pivotally connecting the free end of the other link to a car body, and manually operable means pivotally connected to the door, said manually operable means being parallel to the adjacent link of the toggle when the toggle links are in the door closed position.

15. In an operating device for railway car sliding doors, a pair of pivotally connected toggle links, means for pivotally connecting the free ends of said links to a car and to its sliding door respectively, an operating bar pivoted on said door, one end of said bar being operatively connected to one of said links to lift the same and move it in the door opening direction upon the application of a downward strain on the other end of said bar, said bar being movable into a position during the door opening movement wherein the downward toggle lifting strain on said bar is transformed to a lateral strain in the door opening direction.

16. In an operating device for railway car sliding doors, a pair of pivotally connected toggle links, means for pivotally connecting the free ends of said links to a car and to its sliding door respectively, an operating bar pivoted on said door intermediate the length of the link which is pivotally connected to said door, one end of said bar being operatively connected to one of said links to move the same in the door opening direction upon the application of a downward strain to the other end of said bar, the last mentioned end of said bar being movable into a position during the door opening movement wherein the downward toggle lifting strain is transformed to a lateral strain in the door opening direction to assist in opening the door, the connecting means between the operating bar and its toggle link being such that strain in a reverse direction on the operating member is partially applied directly to the door to move the same in the closing direction and partially to said toggles to straighten the same and assist thereby in closing said door.

17. In a sliding door operating means, a pair of pivotally connected toggle links, means for pivotally connecting the free end of one link to a door and means for pivotally connecting the free end of the other link to a relatively stationary abutment, an operating member with means for pivotally connecting the same to a door adjacent to the link which is pivoted to said door, said operating member overlapping said link in one position, whereby said parts will mutually steady one another, part of said operating member projecting below said link and arranged whereby a downward pull on the last mentioned end of said operating member will operate to buckle said toggle links.

HENRY G. VOIGHT.

Copies of this patent may be obtained for five cents each, by addressing the "Commissioner of Patents, Washington, D. C."